(12) United States Patent
Wang et al.

(10) Patent No.: US 7,869,504 B2
(45) Date of Patent: Jan. 11, 2011

(54) COEFFICIENT SCALING OPERATIONAL UNITS

(75) Inventors: Zhenguo Wang, Beijing (CN); Jian Liu, Beijing (CN); Tianyi Zhou, Beijing (CN); Xiaohai Zhao, Beijing (CN); Zhonghan Deng, Beijing (CN)

(73) Assignees: Vimicro Corporation, Beijing (CN); Wuxi Vimicro Corporation, Jiangsu (CN)

( * ) Notice: Subject to any disclaimer, the term of this patent is extended or adjusted under 35 U.S.C. 154(b) by 1460 days.

(21) Appl. No.: 11/262,150

(22) Filed: Oct. 28, 2005

(65) Prior Publication Data

US 2007/0030895 A1 Feb. 8, 2007

(30) Foreign Application Priority Data

Aug. 8, 2005 (CN) .................... 2005 1 0087767

(51) Int. Cl.
*H04N 7/12* (2006.01)
*G06K 9/00* (2006.01)

(52) U.S. Cl. .................... 375/240.03; 375/240.26; 382/251; 382/253

(58) Field of Classification Search ............ 375/240.03, 375/240.26
See application file for complete search history.

(56) References Cited

U.S. PATENT DOCUMENTS

| | | | |
|---|---|---|---|
| 5,146,324 A * | 9/1992 | Miller et al. ........... | 375/240.03 |
| 5,479,166 A * | 12/1995 | Read et al. ............. | 341/65 |
| 6,282,631 B1 * | 8/2001 | Arbel ..................... | 712/35 |
| 6,529,460 B1 * | 3/2003 | Belser ................... | 369/59.21 |
| 6,826,526 B1 * | 11/2004 | Norimatsu et al. ....... | 704/222 |
| 7,280,595 B1 * | 10/2007 | Lin ....................... | 375/240.03 |
| 7,336,720 B2 * | 2/2008 | Martemyanov et al. | 375/240.12 |
| 7,773,671 B2 * | 8/2010 | Malvar .................. | 375/240.03 |
| 2002/0016161 A1 * | 2/2002 | Dellien et al. .......... | 455/403 |
| 2002/0054638 A1 * | 5/2002 | Hanamura et al. ..... | 375/240.03 |
| 2004/0131267 A1 * | 7/2004 | Adiletta et al. ......... | 382/236 |
| 2006/0126724 A1 * | 6/2006 | Cote et al. ............. | 375/240.03 |
| 2006/0165181 A1 * | 7/2006 | Kwan et al. ............ | 375/240.24 |
| 2006/0282237 A1 * | 12/2006 | Xiao et al. ............. | 703/2 |

* cited by examiner

*Primary Examiner*—Vikkram Bali
*Assistant Examiner*—Michelle Entezari
(74) *Attorney, Agent, or Firm*—Wuxi Sino IP Agency, Ltd.; Joe Zheng

(57) ABSTRACT

Techniques for providing a coefficient scaling operational unit to perform the coefficient scaling computation for various image compression schemes are disclosed. To minimize multiple units, each for one image encoding/decoding scheme (e.g., MPEG4 and WMV9), a single coefficient scaling operational unit is designed to accommodate various standards. In one embodiment, the coefficient scaling operational unit comprises an arithmetic logic unit. The arithmetic logic unit operates in accordance with a formula involving multiplication and division. Parameters such as coefficients and quantization parameters are provided to perform the coefficient scaling operation.

17 Claims, 4 Drawing Sheets

COEFFICIENT SCALING OPERATIONAL UNITS

BACKGROUND OF THE INVENTION

1. Field of the Invention

The present invention relates to the area of computing coefficients used in image codec, and more particularly to an operational unit for performing the coefficient scaling computations.

2. Description of Related Art

In the field of image encoding/decoding, various image coding/decoding standards will exist concurrently for a very long time. The compatibility with various standards becomes an essential feature for image processing chips. The chips that are provided with various image encoding/decoding algorithms and compatible with multiple image protocols are commonly referring to as "multi-mode image encoding/decoding chips". The current design approach for designing multi-mode image coding/decoding chips is to add another coding/decoding protocol based on the originally designed encoding/decoding protocol. For example, in the encoding/decoding algorithms for WMV9 protocol and MPEG4 protocols, their coefficient scaling computation in coefficient estimation is conducted separately according to their respective coefficient scaling operational formula.

The coefficient scaling operational formula for the MPEG4 is:

$$(QFA*QPA)//QPX, \quad (1)$$

wherein QFA is a coefficient, QPA is a quantization parameter, QPX is a quantization parameter and $QPX \in [1,31]$, QPX is an integral.

The coefficient scaling operational formula for the WMV9 is:

$$\overline{DC_p} = (DC_p * DSTEP_p * DQScale[DCSTEP_c] + 0x20000) \gg 18 \quad (2)$$

wherein DCp is a coefficient, DCSTEPp is a quantization parameter, DCSTEPc is an index parameter and $DCSTEPc \in [1,31]$, the DCSTEPc is a variable, DQScale[DCSTEPc] is a function of DCSTEPc, of which the value list are shown as follows:

| DCSTEPc | DQScale [DCSTEPc] |
|---------|-------------------|
| 1 | 262144 |
| 2 | 131072 |
| 3 | 87381 |
| 4 | 65536 |
| ... | |
| 8 | 32768 |
| ... | |
| 11 | 23831 |
| ... | |
| 14 | 18725 |
| ... | |
| 18 | 14564 |
| ... | |
| 22 | 11916 |
| ... | |
| 26 | 10082 |
| ... | |
| 28 | 9362 |
| 29 | 9039 |
| 30 | 8738 |
| 31 | 8456 |

In multi-mode image coding/decoding chips, to realize the coefficient scaling computation for these two protocols according to the respective corresponding formulas, two different arithmetic logic units have to be provided, thereby increasing the quantity of hardware modules, the chip size and the production cost.

Thus there is a need for techniques for a coefficient scaling operational unit capable of performing the coefficient scaling computation for different encoding/decoding standards or image compression schemes.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for providing one coefficient scaling operational unit to perform the coefficient scaling computation for various image compression schemes, such as MPEG4 and WMV9. According to one aspect of the techniques, a coefficient scaling operational unit comprises an arithmetic logic unit with at least first, second and third signal input terminals. The arithmetic logic unit operates in accordance with a formula involving multiplication and division. Parameters such as coefficients and quantization parameters are provided to the input terminals to perform the coefficient scaling operation. As a result, the coefficient scaling operational unit using only one module can accommodate various image compression schemes.

According to one embodiment, the present invention is a coefficient scaling operational unit. The coefficient scaling operational unit may be implemented as a single chip and integrated in a circuit to perform the coefficient scaling operation. The coefficient scaling operational unit comprises a first signal input terminal and a second signal input terminal to receive a coefficient and a quantization parameter, respectively, in a coefficient scaling computation for at least first and second image compression schemes; a third signal input terminal to receive an index parameter for the first image compression scheme or a quantization parameter for the second image compression scheme; and an arithmetic logic unit, receiving respective parameters from the first, second and third signal input terminals, configured to perform the coefficient scaling computation according to a following formula:

a parameter at the first signal input terminal X a parameter at the second signal input terminal parameter/a parameters at the third signal input terminal parameter.

If the first image compression scheme is WMV9 and the second image compression scheme is MPEG4, the coefficient and the quantization parameter are DCp and DCSTEPp, respectively, for WMV9, or the coefficient and the quantization parameter are QFA and QPA, respectively, for MPEG4.

One of the features, benefits and advantages in the present invention is to provide techniques for managing access to a file allocation table in an external storage device.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
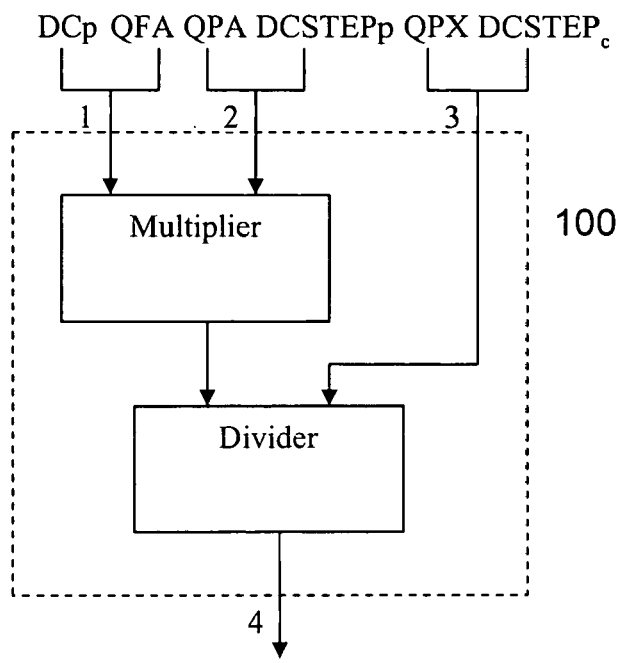
FIG. 1 is a block diagram showing an embodiment of a coefficient scaling operational unit according to the present invention.

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

In general, the present invention pertains to techniques for providing one hardware module to perform the coefficient scaling computation for various encoding/decoding standards (e.g., MPEG4 and WMV9). To facilitate the description of the present invention, the description hereinafter will be focused on two compression standards, MPEG4 and WMV9. Those skilled in the art shall understand that the description herein may be readily applied to other compression standards. At first, it is deemed necessary to explain why only one hardware module can be provided to perform the coefficient scaling computation for MPEG4 and WMV9 in the present invention.

The analysis of the function value of the DQScale [DCSTEPc] in the WMV9 shows that they can be expressed as follows:

$$262144d=40000H=2^{18}/1,$$

$$131072d=20000H=2^{18}/2,$$

$$87381d=15555H=2^{18}/3,$$

$$65536d=10000H=2^{18}/4,$$

$$\ldots$$

$$32768d=8000H=2^{18}/8,$$

$$\ldots$$

$$21845d=5555H=2^{18}/12,$$

$$\ldots$$

$$16384d=4000H=2^{18}/16,$$

$$\ldots$$

$$13107d=3333H=2^{18}/20,$$

$$\ldots$$

$$10923d=2AABH=2^{18}/24,$$

$$\ldots$$

$$9362d=2492H=2^{18}/28,$$

$$\ldots$$

$$8456d=2108H=2^{18}/31.$$

Accordingly, it is found that the look-up table of the function DQScale [DCSTEPc] is a reciprocal table, a formula can thus be expressed as:

$$\text{DQScale[DCSTEPc]}=2^{18}/\text{DCSTEPc} \quad (3)$$

Substituting the formula (3) for the DQScale[DCSTEPc] in the formula (2), the following is obtained:

$$\overline{DC_P}=(DC_p*\text{DCSTEP}_p*2^{18}/\text{DCSTEP}_c+0x20000)\\>>18 \quad (4)$$

In the formula (4), after the item "plus 0x20000", the computation result ought to right move 18 bits, so the influence of the addition to the final result may be neglected. Additionally, in formula (4), after the multiplication and the division, their results shall be multiplied by $2^{18}$, namely the result shall be left moved 18 bits, after the addition, and the result shall be right moved 18 bits, so the formula (4) can be simplified as:

$$\overline{DC_P} = \frac{DC_P*DCSTEP_P}{DCSTEP_c} \quad (5)$$

Comparing the formula (1) and the formula (5), it can be noted that these two formulas both have a multiplication and a division. Moreover, as a divider, the index parameter DCSTEPc of the WMV9, and the quantization parameter QPX of the MPEG4 both are an integer from 1 to 31, inclusive. Therefore, both the coefficient scaling operational formula (1) for the MPEG4 and the coefficient scaling formula (2) for the WMV9 can be expressed as: $Y=A*B/C$, wherein, the C is the quantization parameter QPX or the index parameter DCSTEPc. It also can be expressed as: $Y=A*B*D$, wherein the D is the reciprocal value of the quantization parameter QPX or the index parameter DCSTEPc.

It can be seen that the common factor for the MPEG4 and the WMV9 in the coefficient scaling computation has been found. According to one aspect of the present invention, only one arithmetic logic unit is provided to perform the coefficient scaling computation for MPEG4 and WMV9.

Referring now to FIG. 1, which shows a coefficient scaling operational unit 100 according to one embodiment of the present invention. The coefficient scaling operational unit 100 may be implemented alone or integrated in multi-mode image coding/decoding chips. As shown in FIG. 1, the coefficient scaling operational unit 100 includes an arithmetic logic unit with a first signal input terminal 1, a second signal input terminal 2, a third signal input terminal 3 and a signal output terminal 4. The first signal input terminal 1 is to receive one of the DCp and the DCSTEPp for the WMV9, or one of the QFA and the QPA for the MPEG4. The second signal input terminal 2 is to receive one of the DCp and the DCSTEPp for the WMV9, or the other one of the QFA and the QPA for the MPEG4. In addition, the first signal input terminal 1 is to receive the DCp and the QFA, the second signal input terminal 2 is to receive one of the DCSTEPp and the QPA. The third signal input terminal 3 is simultaneously to receive the DCSTEPc for the WMV9 or the QPX for the MPEG4.

These inputs are essentially the parameters or variables and the coefficient scaling computation is carried out according to following formula:

(The first signal input terminal parameter $X$ The second signal input terminal parameter)/The third signal input terminal parameter.

The computation results are output from the signal output terminal 4. As shown in FIG. 1, the arithmetic logic unit includes a multiplier and a divider. The multiplier is used to realize the multiplications between the input parameters in the formula. The divider is used to realize the division between the input parameters in the formula.

Two input nodes of the multiplier are respectively coupled to the first signal input terminal 1 and the second signal input terminal 2, a product output thereof is coupled to an input node of the divider, a divisor input node of the divider is coupled to the third signal input terminal 3, a quotient output node of the divider is coupled to the signal output terminal 4.

When the coefficient scaling computation for the WMV9 is carried out, the arithmetic logic unit gets the coefficient DCp from the first signal input terminal 1, the quantization parameter DCSTEPp from the second signal input terminal 2 and the index parameter DCSTEPc from the third signal input terminal 3. The multiplier proceeds with the multiplication between the coefficient DCp and the quantization parameter DCSTEPp and provides the multiplication product as the dividend into the divider. The divider proceeds with the division between the multiplication product and the index parameter DCSTEPc, the quotient of the division is outputted via the signal output terminal, whereby the coefficient scaling computation result for the WMV9 can be gained.

When the coefficient scaling computation for the MPEG4 is carried out, the arithmetic logic unit A gets the coefficient QFA from the first signal input terminal 1, the quantization parameter QPA from the second signal input terminal 2 and the quantization parameter QPX from the third signal input terminal 3. The multiplier proceeds with the multiplication between the coefficient QFA and the quantization parameter QPA and provides this multiplication product as the dividend QPA into the divider. The divider proceeds with the division between the multiplication product and the quantization parameter QPX, the quotient of the division is outputted via the signal output terminal, whereby the coefficient scaling computation result for the MPEG4 can be gained.

In order to verify the performance of the embodiment, the inventors have performed verification operations. As part of the verification, the multiplier and the divider in a cell library provided by Synopsys are used with a clock frequency of the system being 166M, thereby a delay time of a key path of the coefficient scaling operational unit shall be less than 6 ns'. The multiplication is realized by a multiplier DW02_mult# (A_WIDTH=12, B_WIDTH=6), and the division is realized by a divider of 17/6.

Estimating the area of the multiplier, their reporting files are as follows:

Report: area

Design : VDEC_SMULTI12×6P0 (the multiplier's name in the Synopsys' cell library)

Library(s) Used: UMC018AG_AASW (The name of the cell library)

Total area: 8298.486328 (the estimated area value)

The key path of the multiplier is 5.58 ns, less than 6 ns, so that the multiplication can be finished within one clock cycle.

Estimating the area of the divider, their reporting files are as follows:

Report: area

Design: dw_div

Library(s) Used: UMC018AG_AASW

Total area: 45839.781250

The key path of the divider is 20.00 ns, it shall be finished within four clock cycles.

Figure 2:
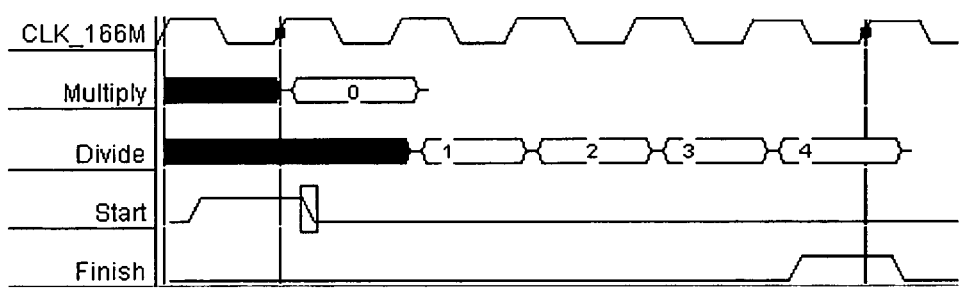
FIG. 2 is a computation timing diagram of the embodiment of FIG. 1.

From the estimation, the inventors have derived the area of the arithmetic logic unit including a multiplier and a divider is about 8298+45839=54137. FIG. 2 shows the corresponding timing diagram of FIG. 1. Due to the limitation of the key path, the computation frequency of the embodiment is about one computation for every four cycles.

Figure 3:
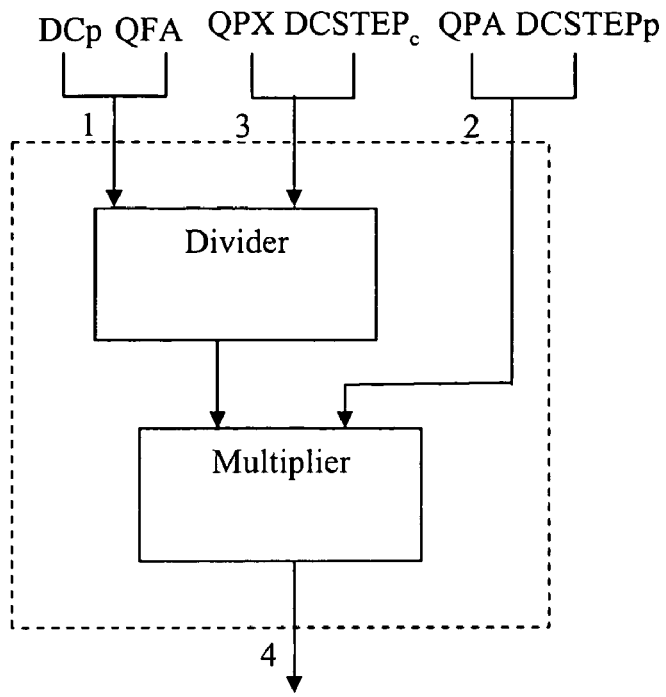
FIG. 3 is a block diagram showing another embodiment of the coefficient scaling operational unit according to the present invention.

Referring to FIG. 3, there shows another embodiment of the coefficient scaling operational unit. As it can be observed, this embodiment is substantially similar to the embodiment of FIG. 1 with the exception of the dividend exchanged with multiplier. As a result, the input node of the divider is coupled to the first signal input terminal and a divisor input node of the divider is coupled to the third signal input terminal. Further the quotient output node of the divider is coupled to one input node of the multiplier while another input node of the multiplier is coupled to the second signal input terminal. A product output of the multiplier is coupled to the signal output terminal.

Figure 4:
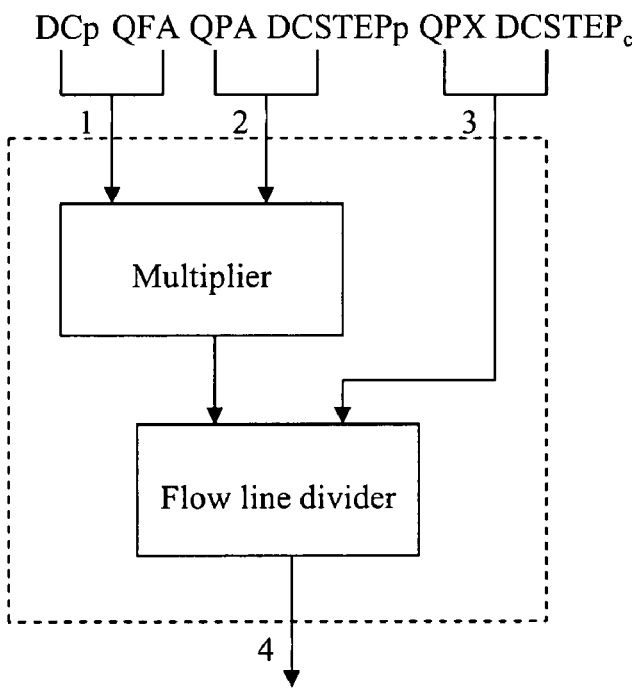
FIG. 4 is a block diagram showing still another embodiment of the coefficient scaling operational unit according to the present invention.

Referring now to FIG. 4, there shows a coefficient scaling operational unit, according to one embodiment of the present invention. In view of the embodiment of FIG. 1, a flow line divider is now used. This substitution shall lead to some changes of the performance of the coefficient scaling operational unit in terms of speed, area and power consumption.

The verification operation related to the performances the third embodiment is carried out. The clock frequency of the system is set to be 166M, the delay time of the key path of the module shall be less than 6 ns'. The divider is changed to a flow line structure, which can improve the data rate of the system. The algorithm comes from the manual computation of the binary system division, two subtractions are carried out in level one flow line, and the needed flow line levels are:

(17+6)/2=11.5

Namely there are 12 levels of flow line.

The estimated divider area, their report files are as follows:

Report: area
Design: ADCP_SCALE_PE
Library(s) Used: UMC018AG_AASW
Total area: 69986.791052

The delay time of the key path of the flow line divider is 5.72 ns.

Figure 5:
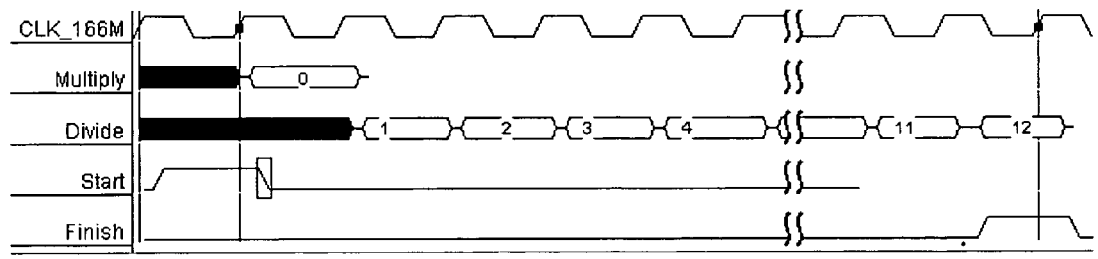
FIG. 5 is a computation timing diagram of the embodiment of FIG. 4.

From the above estimation, the inventors have derived that the area of the embodiment of FIG. 4 is around 8298+69986=78284. The corresponding timing sequencing of the embodiment of FIG. 4 is shown in FIG. 5. Because a flow line structure is used, it can receive a new computation per cycle, but its waiting time is 13 cycles.

With the various embodiments, it can be concluded that the equation Y=A*B/C can be used to realize the function of the arithmetic logic unit. For completeness, FIG. 6 shows an embodiment adopting Y=A*B*D mode to realize the function of the arithmetic logic unit.

The parameters coupling to the three signal input terminals can be substantially similar as with the embodiment of FIG. 1. The arithmetic logic unit now comprises a multiplier-adder and a reciprocal table. The multiplier-adder is used to realize multiplications and additions between the parameters in the coefficient scaling computation. The reciprocal table stores the reciprocal of the index parameter DCSTEPc and the quantization parameter QPX, and takes the input index parameter DCSTEPc or the quantization parameter QPX as the index and outputs the corresponding reciprocal values.

Figure 6:
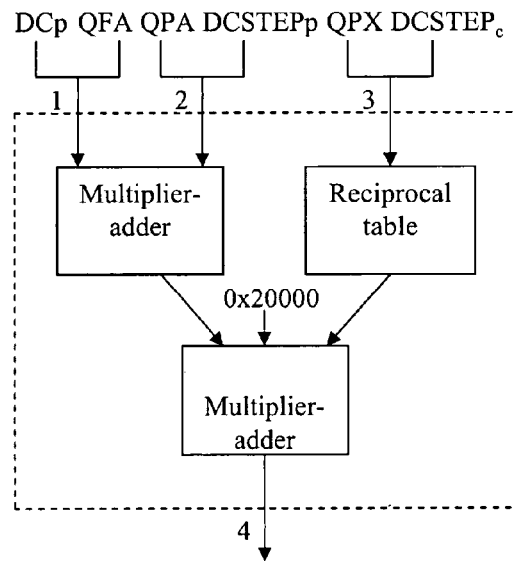
FIG. 6 is a block diagram showing yet another embodiment of the coefficient scaling operational unit according to the present invention.

It should be noted that, although the FIG. 6 shows two multiplier-adders, the two multiplier-adders in operation can be the same one. According to one embodiment, one multiplier-adder is used to accomplish different computations in different clock cycles.

Two input nodes of the multiplier-adder are respectively coupled to the first signal input terminal and the second signal input terminal, an addend input node of the multiplier-adder receives the parameter 0x33 20000. An input node of the reciprocal table is coupled to the third signal input terminal, an output node of the reciprocal table is coupled to one of the two input nodes of the multiplier-adder, a product output of the multiplier is c coupled to the other one of the two input nodes of the multiplier-adder, the signal output terminal is coupled to the output terminal of the multiplier-adder.

When the coefficient scaling computation for the WMV9 is carried out, the arithmetic logic unit gets the coefficient DCp from the first signal input terminal 1, the quantization parameter DCSTEPp from the second signal input terminal 2 and the index parameter DCSTEPc from the third signal input terminal 3. At one clock cycle, the multiplier-adder accomplishes the multiplication between the coefficient DCp and the quantization parameter DCSTEPp. At a next one clock cycle, the multiplier-adder takes the product in the last clock cycle as one multiplicator. At the same time, the reciprocal table will take the index parameter DCSTEPc as the index and find out the corresponding reciprocals from the stored reciprocals. For example when the DCSTEPc is 1, its reciprocal is 262144, when the DCSTEPc is 2, its reciprocal is 13107. The reciprocal table outputs reciprocal values as the other multiplicator. At the next one clock cycle, the multiplier-adder will multiply the values of the two multiplicators and add to the parameter 0x20000. The last result is output via the signal output terminal 4.

According to one application, the result's binary value is right moved 18 bits, which is taking the nineteenth value of the final result from the signal output terminal 4 as the final coefficient scaling computation result for the WMV9.

When the protocol coefficient scaling computation for MPEG4 is carried out, the arithmetic logic unit gets the coefficient QFA from the first signal input terminal 1, the quantization parameter QPA from the second signal input terminal 2 and the quantization parameter QPX from the third signal input terminal 3. At one clock cycle, the multiplier-adder multiplies the coefficient QFA with the quantization parameter QPA. At next one clock cycle, the multiplier-adder takes the product as one multiplicator, at the same time, and takes the reciprocal value from the reciprocal table which is found out according to the coefficient quantization parameter QPX as the other multiplicator. The multiplier-adder multiplies these two values.

With respect to MPEG4, no value is provided to the addition input terminal. After all multiplications are finished, the multiplier-adder outputs the product as the final coefficient scaling results to the signal output terminal 4.

The verification operations relate to the performances of the embodiment of FIG. 6 is also carried out. The system working clock is set to 166M, the time delay of the key path of the module shall be less than 6 ns. One multiplier-adder MAC_DW20X17 is used to accomplish the abovementioned computation.

Its area estimation file is:
Report: area
Design: MAC_ADCP
Library(s) Used: UMC018AG_AASW
Total area: 67587.320312

Figure 7:
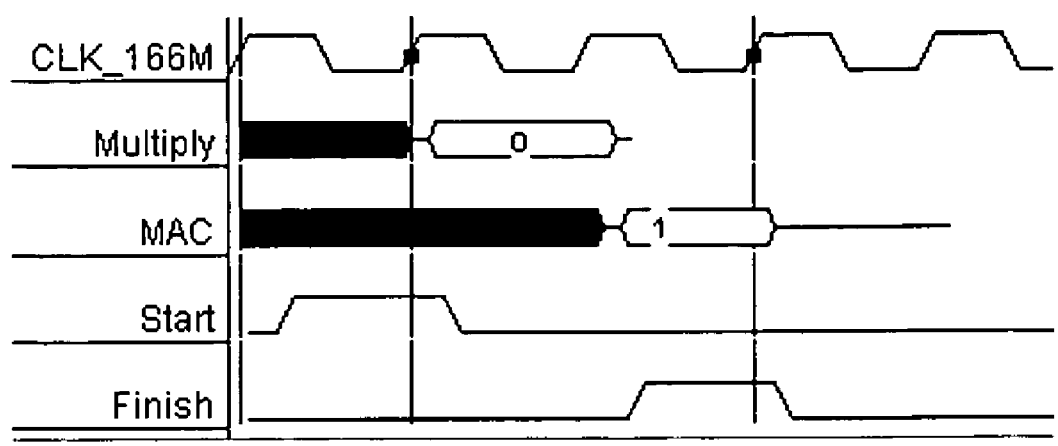
FIG. 7 is a computation timing diagram of the embodiment of FIG. 6.

For the estimated multiplier-adder timing sequencing, the key path time in its report file is 5.08 ns. The corresponding timing sequencing diagram is shown in FIG. 7. As it is shown, it needs two clock cycles to accomplish one computation.

Given the detailed description of the presentation, various other embodiments may be implemented. In the embodiment of FIG. 6, two multiplier-adders may be simply used. The two input nodes of the first multiplier-adder are respectively connected to the first signal input terminal and second signal input terminal, its output node is connected to one input node of the second multiplier-adder. The input node of the reciprocal table is connected to the third signal input terminal. It's the output node is connected to the other one input node of the second multiplier-adder. The input parameter 0x20000 via the addend input node of the second multiplier-adder, the output node of the second multiplier-adder is connected to the signal output terminal. Further, it is possible to combine a multiplier and an adder to substitute the multiplier-adder.

At last but not least, the inventors have changed the connecting position of the reciprocal table output terminal, so that the arithmetic logic unit proceeds with the multiplication between the input parameter of the first signal input terminal or the second signal input terminal and the output value of the reciprocal table, and then proceed with the remaining multiplication and addition.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. A coefficient scaling operational unit in an image codec chip, the coefficient scaling operational unit comprising:
   a first signal input terminal and a second signal input terminal to receive a coefficient and a quantization parameter, respectively, in a coefficient scaling computation for at least first and second image compression schemes;

a third signal input terminal to receive an index parameter for the first image compression scheme or a quantization parameter for the second image compression scheme; and an arithmetic logic unit, receiving respective parameters from the first, second and third signal input terminals, configured to perform the coefficient scaling computation according to a following formula:

(a parameter at the first signal input terminal X a parameter at the second signal input terminal parameter)/a parameters at the third signal input terminal.

2. The coefficient scaling operational unit as claimed in claim 1, wherein the first image compression scheme is WMV9, and the second image compression scheme is MPEG4.

3. The coefficient scaling operational unit as claimed in claim 2, wherein the coefficient and the quantization parameter are DCp and DCSTEPp, respectively, for WMV9, or the coefficient and the quantization parameter are QFA and QPA, respectively, for MPEG4.

4. The coefficient scaling operational unit as claimed in claim 3, wherein when the coefficient scaling computation for the WMV9 is performed, the arithmetic logic unit receives the coefficient DCp from the first signal input terminal, the quantization parameter DCSTEPp from the second signal input terminal, and the index parameter DCSTEPc from the third signal input terminal; and wherein when the coefficient scaling computation for the MPEG4 is performed, the arithmetic logic unit receives the coefficient QFA from the first signal input terminal, the quantization parameter QPA from the second signal input terminal and the quantization parameter QPX from the third signal input terminal.

5. The coefficient scaling operational unit as claimed in claim 1, wherein the arithmetic logic unit includes a multiplier and a divider, the multiplier is used to realize a multiplication in the formula and the divider is used to realize a division in the formula.

6. The coefficient scaling operational unit as claimed in claim 5, wherein two input nodes of the multiplier are respectively coupled to the first signal input terminal and the second signal input terminal, a product output of the multiplier is coupled to a dividend input node of the divider, a divisor input node of the divider is coupled to the third signal input terminal, a quotient output of the divider is coupled to the signal output terminal.

7. The coefficient scaling operational unit as claimed in claim 5, wherein a dividend input node of the divider is coupled to the first signal input terminal and a divisor input node of the divider is coupled to the third signal input terminal, and wherein a quotient output node of the divider is coupled with one input node of the multiplier while another input node of the multiplier is coupled with the second signal input terminal, a product output of the multiplier is coupled to the signal output terminal.

8. The coefficient scaling operational unit as claimed in claim 1, wherein the arithmetic logic unit includes a multiplier-adder and a reciprocal table, the multiplier-adder is used to realize multiplications and additions between parameters in the coefficient scaling computation, and wherein the reciprocal table stores a reciprocal of the index parameter and the quantization parameter, and takes the input index parameter or the quantization parameter as the index and output corresponding reciprocal values.

9. The coefficient scaling operational unit as claimed in claim 8, wherein the first image compression scheme is WMV9, and the second image compression scheme is MPEG4, therefore, the coefficient and the quantization parameter are DCp and DCSTEPp, respectively, for WMV9, or the coefficient and the quantization parameter are QFA and QPA, respectively, for MPEG4, and wherein the index is DCSTEPc and the quantization parameter is QPX, and the input index parameter is DCSTEPc or QPX.

10. The coefficient scaling operational unit as claimed in claim 8, wherein two input nodes of the multiplier-adder are respectively connected to the first signal input terminal and the second signal input terminal, an addend input terminal provides a parameter 0x20000, an input node of the reciprocal table is coupled to the third signal input terminal, an output node of the reciprocal table is coupled to one of the input nodes of the multiplier-adder, a product output of the multiplier is coupled another input node of the multiplier-adder, the signal output terminal is coupled to the output node of the multiplier-adder.

11. The coefficient scaling operational unit as claimed in claim 1, wherein the arithmetic logic unit includes first and second multiplier-adders, two input nodes of the first multiplier-adder are respectively coupled to the first signal input terminal and second signal input terminal, an output node of the first multiplier-adder is coupled to one input node of the second multiplier-adder, an input node of the reciprocal table is coupled to the third signal input terminal, an output node of the reciprocal table is coupled to another input node of the second multiplier-adder.

12. The coefficient scaling operational unit as claimed in claim 11, wherein a constant input parameter is provided to the second multiplier-adder, the output node of the second multiplier-adder is connected to the signal output terminal.

13. The coefficient scaling operational unit as claimed in claim 12, wherein the first multiplier-adder and the second multiplier-adder are respectively configured to proceed with different computations in different clock cycles.

14. The coefficient scaling operational unit as claimed in claim 1, wherein the coefficient scaling operational unit is integrated in a circuit for performing coefficient scaling operations for various image compression standards.

15. A coefficient scaling operational unit in an image codec chip, the coefficient scaling operational unit comprising:
an arithmetic logic unit, receiving respective parameters, configured to perform a coefficient scaling computation according to a following formula:
(a first parameter X a second parameter)/a third parameters;
where the first parameter and the second parameters are a coefficient and a quantization parameter, respectively, in the coefficient scaling computation for at least first and second image compression schemes;
wherein an index parameter is provided for the first image compression scheme or a quantization parameter for the second image compression scheme.

16. The coefficient scaling operational unit as claimed in claim 15, wherein the coefficient scaling operational unit is integrated in a circuit for performing coefficient scaling operations, the circuit is operationally applicable to any one of the at least first and second image compression schemes.

17. The coefficient scaling operational unit as claimed in claim 15, wherein the arithmetic logic unit includes modules configured to perform multiplication and division of the formula.

* * * * *